US009777628B2

(12) United States Patent
Galasso et al.

(10) Patent No.: US 9,777,628 B2
(45) Date of Patent: Oct. 3, 2017

(54) SYSTEM AND METHOD FOR PROCESSING GREENHOUSE GASES

(71) Applicant: The Boeing Company, Chicago, IL (US)

(72) Inventors: D. Anthony Galasso, Trabuco Canyon, CA (US); Jon A. Magnuson, Corona del Mar, CA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 13/767,053

(22) Filed: Feb. 14, 2013

(65) Prior Publication Data
US 2014/0053565 A1 Feb. 27, 2014

Related U.S. Application Data

(60) Provisional application No. 61/692,583, filed on Aug. 23, 2012.

(51) Int. Cl.
F02C 3/20 (2006.01)
B01D 53/04 (2006.01)

(52) U.S. Cl.
CPC ............ F02C 3/20 (2013.01); B01D 53/04 (2013.01); B01D 2253/108 (2013.01); B01D 2257/504 (2013.01); B01D 2258/05 (2013.01); Y02C 10/08 (2013.01); Y02C 20/20 (2013.01); Y02E 20/12 (2013.01); Y02E 20/326 (2013.01); Y02E 50/346 (2013.01); Y02P 60/24 (2015.11)

(58) Field of Classification Search
CPC .................................. B01D 53/02; B01D 53/14
See application file for complete search history.

(56) References Cited

U.S. PATENT DOCUMENTS

| 3,359,707 A | 12/1967 | Louis |
| 3,493,339 A | 2/1970 | Wheldon et al. |
| 3,660,967 A | 5/1972 | Collins et al. |
| 3,853,507 A | 12/1974 | Monroe et al. |
| 4,094,652 A | 6/1978 | Lowther |
| 4,249,915 A | 2/1981 | Sircar et al. |
| 4,312,641 A | 1/1982 | Verrando et al. |

(Continued)

FOREIGN PATENT DOCUMENTS

| DE | 4003533 | 8/1990 |
| DE | 4003533 A1 | 8/1990 |

(Continued)

OTHER PUBLICATIONS

Extended European Search Report, EP 13 18 0916 (2014).

(Continued)

Primary Examiner — Charles Freay
Assistant Examiner — Kenneth J Hansen
(74) Attorney, Agent, or Firm — Walters & Wasylyna LLC

(57) ABSTRACT

A system for processing greenhouse gases including a collection subsystem configured to collect a gaseous mixture including carbon dioxide and methane, a combustion subsystem configured to combust the methane in the gaseous mixture and output a gaseous combustion effluent, wherein the combustion subsystem generates electrical energy, water and additional quantities of carbon dioxide, and a separation subsystem configured to separate the carbon dioxide from the gaseous combustion effluent.

19 Claims, 3 Drawing Sheets

(56) References Cited

U.S. PATENT DOCUMENTS

| | | | |
|---|---|---|---|
| 4,322,394 A | 3/1982 | Mezey et al. | |
| 4,484,933 A | 11/1984 | Cohen | |
| 4,551,197 A | 11/1985 | Guilmette et al. | |
| 4,726,815 A | 2/1988 | Hashimoto et al. | |
| 4,784,672 A | 11/1988 | Sircar | |
| 4,797,141 A | 1/1989 | Mercader et al. | |
| 4,832,711 A | 5/1989 | Christel et al. | |
| 5,059,405 A * | 10/1991 | Watson et al. | 423/210 |
| 5,100,635 A * | 3/1992 | Krishnamurthy et al. | 423/235 |
| 5,221,520 A | 6/1993 | Cornwell | |
| 5,232,474 A | 8/1993 | Jain | |
| 5,233,837 A | 8/1993 | Callahan | |
| 5,261,250 A | 11/1993 | Missimer | |
| 5,282,886 A | 2/1994 | Kobayashi et al. | |
| 5,749,230 A | 5/1998 | Coellner | |
| 6,022,399 A | 2/2000 | Ertl et al. | |
| 6,027,548 A | 2/2000 | Ackley et al. | |
| 6,183,539 B1 | 2/2001 | Rode et al. | |
| 6,205,704 B1 | 3/2001 | Schmitz et al. | |
| 6,293,999 B1 | 9/2001 | Cheng et al. | |
| 6,332,925 B1 | 12/2001 | Noji et al. | |
| 6,337,063 B1 | 1/2002 | Rouleau et al. | |
| 6,502,328 B1 | 1/2003 | Love et al. | |
| 6,621,848 B1 | 9/2003 | Ullman et al. | |
| 6,706,097 B2 | 3/2004 | Zornes | |
| 6,712,879 B2 | 3/2004 | Kato et al. | |
| 7,736,416 B2 | 6/2010 | Nalette et al. | |
| 7,947,120 B2 | 5/2011 | Deckman et al. | |
| 8,128,735 B1 * | 3/2012 | Siriwardane | B01D 53/0462 95/115 |
| 8,435,335 B2 | 5/2013 | Lam et al. | |
| 2001/0009124 A1 | 7/2001 | Suzuki et al. | |
| 2005/0121393 A1 | 6/2005 | Galbraith | |
| 2006/0260189 A1 * | 11/2006 | Reddy et al. | 48/128 |
| 2007/0231233 A1 | 10/2007 | Bose | |
| 2008/0000351 A1 | 1/2008 | Celik et al. | |
| 2008/0200742 A1 | 8/2008 | Doyle et al. | |
| 2008/0314245 A1 | 12/2008 | Hershkowitz et al. | |
| 2009/0232861 A1 | 9/2009 | Wright et al. | |
| 2009/0294366 A1 | 12/2009 | Wright et al. | |
| 2009/0311146 A1 | 12/2009 | Ohno et al. | |
| 2010/0000221 A1 | 1/2010 | Pfefferle | |
| 2010/0024476 A1 | 2/2010 | Shah | |
| 2010/0251887 A1 | 10/2010 | Jain | |
| 2010/0251937 A1 | 10/2010 | Murray et al. | |
| 2010/0284904 A1 | 11/2010 | Castaldi et al. | |
| 2010/0319354 A1 * | 12/2010 | Guidati | F01K 23/10 60/772 |
| 2011/0088550 A1 | 4/2011 | Tirio | |
| 2011/0107914 A1 | 5/2011 | Su et al. | |
| 2011/0185896 A1 | 8/2011 | Eckhardt et al. | |
| 2011/0189075 A1 | 8/2011 | Wright et al. | |
| 2011/0247491 A1 | 10/2011 | Leitgeb et al. | |
| 2011/0296872 A1 | 12/2011 | Eisenberger | |
| 2012/0000365 A1 | 1/2012 | Okano et al. | |
| 2012/0017638 A1 | 1/2012 | Prast et al. | |
| 2012/0048111 A1 | 3/2012 | Nakao et al. | |
| 2012/0204720 A1 | 8/2012 | Tschantz et al. | |
| 2013/0047664 A1 | 2/2013 | DiCenzo | |
| 2013/0192296 A1 | 8/2013 | Betting et al. | |
| 2014/0053761 A1 | 2/2014 | Galasso | |

FOREIGN PATENT DOCUMENTS

| | | |
|---|---|---|
| DE | 10 2007 023668 | 11/2008 |
| EP | 2 438 975 | 4/2012 |
| GB | 2171927 | 9/1986 |
| WO | WO 2012/013596 | 2/2012 |
| WO | WO 2012/030223 | 3/2012 |
| WO | WO 2013/010328 | 1/2013 |

OTHER PUBLICATIONS

Extended European Search Report issued in EP12180636.8 (Dec. 14, 2012).

Amato et al., "Methane Oxycombustion for Low $CO_2$ Cycles: Blowoff Measurements and Analysis," *Journal of Engineering for Gas Turbines and Power*, vol. 133 (Jun. 2011).

Smardzewski et al., "A Laboratory Study of the Dielectric Heating of Molecular Sieve Material," *Naval Research Laboratory*, (May 27, 1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChE Journal*, vol. 53, No. 12 (2007).

Cavenati et al., "Adsorption Equilibrium of Methane, Carbon Dioxide, and Nitrogen on Zeolite 13X at High Pressures," *Journal of Chemical Engineering Data*, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

* cited by examiner

SYSTEM AND METHOD FOR PROCESSING GREENHOUSE GASES

PRIORITY

This application claims priority from U.S. Ser. No. 61/692,583 filed on Aug. 23, 2012.

FIELD

This application relates to the processing of greenhouse gases and, more particularly, to the processing of methane and carbon dioxide recovered from greenhouse gas-producing sites, such as landfills.

BACKGROUND

Greenhouse gases, such as methane ($CH_4$), carbon dioxide ($CO_2$), water vapor ($H_2O$) and ozone ($O_3$), absorb radiation within the infrared range of the electromagnetic spectrum. In the atmosphere, greenhouse gases absorb infrared radiation radiating from the Earth's surface and re-radiate (emit) some of the absorbed infrared radiation back toward the Earth's surface, thereby causing warming at the Earth's surface. This undesired warming due to greenhouse gases in the atmosphere is commonly referred to as the greenhouse effect.

Greenhouse gases originate from a variety of sources, including landfills. In landfills, anaerobic bacteria break down organic matter and produce landfill gas, which is primarily comprised of methane and carbon dioxide. While landfills are typically covered (capped) with soil or other structure to contain the contents of the landfill, landfill gas may diffuse through the landfill cover and enter the atmosphere.

Thus, many landfills employ a methane capture system to collect landfill gas before it escapes to the atmosphere. The collected landfill gas is then typically flared to the atmosphere or combusted in an energy generating system. Unfortunately, the combustion of methane produces carbon dioxide—another greenhouse gas.

Accordingly, those skilled in the art continue with research and development efforts in the field of greenhouse gas processing.

SUMMARY

In one embodiment, the disclosed system for processing greenhouse gases may include a collection subsystem configured to collect a gaseous mixture including carbon dioxide and methane, a combustion subsystem configured to combust the methane in the gaseous mixture and output a gaseous combustion effluent, wherein the combustion subsystem generates electrical energy, water and additional quantities of carbon dioxide, and a separation subsystem configured to separate the carbon dioxide from the gaseous combustion effluent. The separation subsystem may include an adsorbent material, such as a zeolite.

In another embodiment, the disclosed system for processing landfill gas may include a collection subsystem configured to collect the landfill gas, the landfill gas including carbon dioxide and methane, a combustion subsystem configured to combust the methane in the landfill gas and output a gaseous combustion effluent, wherein the combustion subsystem generates electrical energy, water and additional quantities of carbon dioxide, and a separation subsystem configured to separate the carbon dioxide and the water from the gaseous combustion effluent. The separation subsystem may include an adsorbent material, such as a zeolite.

In another embodiment, disclosed is a method for processing greenhouse gases. The method may include the steps of (1) collecting a gaseous mixture including carbon dioxide and methane, (2) combusting the methane to generate electrical energy and output a gaseous combustion effluent, and (3) separating the carbon dioxide from the gaseous combustion effluent. The separating step may be performed using an adsorbent material, such as a zeolite.

In yet another embodiment, disclosed is a method for processing landfill gas. The method may include the steps of (1) collecting the landfill gas, which includes carbon dioxide and methane, (2) combusting the methane to generate electrical energy and output a gaseous combustion effluent, and (3) separating the carbon dioxide from the gaseous combustion effluent using an adsorbent material, such as a zeolite.

Other embodiments of the disclosed system and method for processing greenhouse gases will become apparent from the following detailed description, the accompanying drawings and the appended claims.

DETAILED DESCRIPTION

Figure 1:
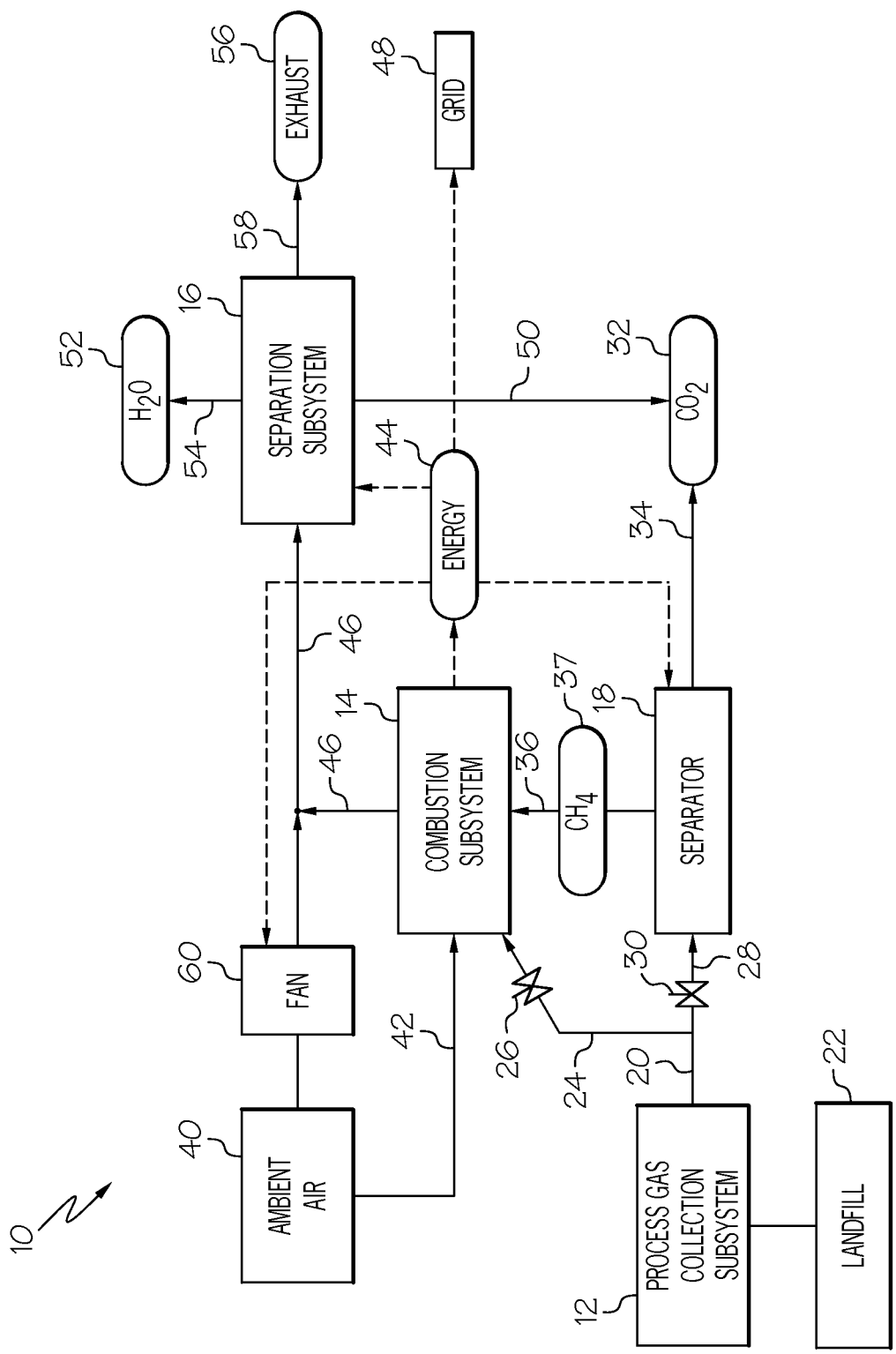
FIG. 1 is a schematic process flow diagram of one embodiment of the disclosed system for processing greenhouse gases.

Referring to FIG. 1, one embodiment of the disclosed system for processing greenhouse gases, generally designated 10, may include a process gas collection subsystem 12, a combustion subsystem 14 and a separation subsystem 16. The disclosed system 10 may include additional subsystems, such as the optional separator 18, without departing from the scope of the present disclosure.

The process gas collection subsystem 12 may collect and supply to the system 10 a process gas 20. The process gas 20 may be any gaseous mixture that includes methane ($CH_4$) and carbon dioxide ($CO_2$). In addition to methane and carbon dioxide, the process gas 20 may include other constituents, such as water vapor, nitrogen and/or hydrogen sulfide. The concentrations of methane and carbon dioxide in the process gas 20 may vary depending on the source of the process gas 20.

In one particular implementation, the process gas collection subsystem 12 may collect landfill gas from a landfill 22, and may supply the landfill gas to the system 10 as the process gas 20. Therefore, the process gas collection subsystem 12 may include, for example, a series of pipes submerged in the landfill 22 to receive the landfill gas and a blower to draw the landfill gas from the landfill 22 to the surface by way of the submerged pipes.

Without being limited to any particular theory, using landfill gas as the process gas 20 in the disclosed system 10 may present a significant economic opportunity due to the unique composition of landfill gas. Specifically, landfill gas is primarily comprised of methane and carbon dioxide, and the ratio of methane to carbon dioxide is about 50:50 (e.g., the ratio may range from about 45:55 to about 55:45). Therefore, landfill gas includes a significant energy producing component (methane) and a significant useable/sellable component (carbon dioxide), while combustion of the energy producing component (methane) as disclosed herein creates additional quantities of the useable/sellable component (carbon dioxide).

The process gas collection subsystem 12 may supply the process gas 20 to the combustion subsystem 14. For example, fluid line 24 (which may be controlled by a valve 26) may selectively fluidly couple the process gas collection subsystem 12 with the combustion subsystem 14 such that the collected process gas 20 may directly flow to the combustion subsystem 14.

Alternatively, a separator 18 may be interposed between the process gas collection subsystem 12 and the combustion subsystem 14. The separator 18 may receive the process gas 20 by way of fluid line 28 (which may be controlled by a valve 30), and may separate (at least partially) the carbon dioxide from the methane. The separated carbon dioxide may be sent to carbon dioxide collection 32 (e.g., a storage vessel, a pipeline, downstream use or sale, or the like) by way of fluid line 34. The separated methane 37 may be sent to the combustion subsystem 14 by way of fluid line 36.

The optional separator 18 may employ any available technique to separate the carbon dioxide from the methane in the process gas 20.

As one example, the separator 18 may employ vortex flow to effect separation of the carbon dioxide from the methane. For example, the separator 18 may include a static vortex separator and the process gas 20 may be pumped into the vortex separator such that a vortex flow path is induced, thereby causing separation of the carbon dioxide from the methane due to the differences in the molecular weights of carbon dioxide and methane.

As another example, the separator 18 may employ liquefaction to effect separation of the carbon dioxide from the methane. For example, the separator 18 may include a pressure vessel and a pump, wherein the pump pumps the process gas 20 into the pressure vessel at a pressure sufficient to separate the process gas 20 into a liquid fraction and a gaseous fraction. The liquid fraction, which may be primarily comprised of carbon dioxide, may then easily be separated from the gaseous fraction.

As yet another example, the separator 18 may employ physisorption to effect separation of the carbon dioxide from the methane. For example, the separator 18 may include an adsorbent material, such as a zeolite. The process gas 20 may be brought into contact with the adsorbent material such that the carbon dioxide in the process gas 20 adsorbs onto the adsorbent material, leaving the methane in the process gas 20. The adsorbed carbon dioxide may then be released from the adsorbent material by heat or vacuum, thereby regenerating the adsorbent material. Physisorption is described in greater detail below.

At this point, those skilled in the art will appreciate that the decision to use the optional separator 18 may be driven by operating conditions (e.g., process gas composition) and overall system economics. In some situations it may be more efficient to use the optional separator 18, while in other situations it may be more efficient to pass the process gas 20 to the combustion subsystem 14 without separation (i.e., to allow the carbon dioxide component of the process gas 20 to pass through the combustion subsystem 14).

The combustion subsystem 14 may receive the process gas 20 (or the separated methane 37), may mix the process gas 20 with ambient air 40 (which may be supplied by way of fluid line 42) to introduce oxygen to the process gas 20 (if necessary), and may combust the process gas 20. The combustion process may generate electrical energy 44 and may output a gaseous combustion effluent 46.

Those skilled in the art will appreciate that the amount of ambient air 40 mixed with the process gas 20 may depend on the composition of the process gas 20. Since landfill gas includes a significant amount of carbon dioxide (e.g., about 50 percent), a significant amount of ambient 40 may be required to facilitate combustion. Various air moving units (e.g., fans) may be employed to ensure the combustion subsystem 14 is supplied with a sufficient amount of ambient air 40 to sustain efficient combustion.

The electrical energy 44 generated by the combustion subsystem 14 may be used to power the various components of the system 10, such as the separation subsystem 16, the optional separator 18 and/or the fan 60 (discussed below). Alternatively (or additionally), the electrical energy 44 generated by the combustion subsystem 14 may be sold to the grid 48. Therefore, the electrical energy 44 generated by the combustion subsystem 14 may be one of several income sources of the disclosed system 10.

The combustion subsystem 14 may include any suitable combustion apparatus or system. As one example, the combustion subsystem 14 may include an internal combustion engine with intermittent combustion, such as a modified diesel engine. As another example, the combustion subsystem 14 may include a continuous combustion engine, such as a turbine (e.g., a microturbine). While a turbine may be more efficient at producing electrical energy 44 than an internal combustion engine with intermittent combustion, a less efficient combustion subsystem 14, such as an internal combustion engine with intermittent combustion (e.g., a diesel engine modified to run on methane), may generate more carbon dioxide and, therefore, may improve overall system economics.

The combustion subsystem 14 may convert the methane in the process gas 20 (or the separated methane 37) to carbon dioxide and water, as follows:

$$CH_4 + 2O_2 \rightarrow CO_2 + 2H_2O \qquad\text{(Eq. 1)}$$

Thus, the gaseous combustion effluent 46 may comprise carbon dioxide and water, as well as the constituents of ambient air 40 (e.g., nitrogen, oxygen) that have passed through the combustion subsystem 14 and other combustion byproducts (e.g., carbon monoxide, nitrogen oxides). As one example, when the process gas 20 is landfill gas fed directly to the combustion subsystem 14, the gaseous combustion effluent 46 may comprise about 20 percent by weight carbon dioxide. As another example, when the combustion subsystem 14 is fed separated methane 37 by way of fluid line 36, the gaseous combustion effluent 46 may comprise about 12 percent by weight carbon dioxide.

The gaseous combustion effluent 46 may be substantially free of methane, which may be substantially completely combusted within the combustion subsystem 14.

The gaseous combustion effluent 46 may be supplied to the separation subsystem 16. The separation subsystem 16 may separate the carbon dioxide and water from the gaseous combustion effluent 46, and may send the separated carbon dioxide to carbon dioxide collection 32 by way of fluid line 50 and may send the separated water to water collection 52 (e.g., a storage vessel, a pipeline, downstream use or sale, or the like) by way of fluid line 54. The balance of the gaseous combustion effluent 46 (e.g., nitrogen, oxygen) exiting the separation subsystem 16 may be released as exhaust 56 by way of fluid line 58.

Thus, the collected carbon dioxide and water 32, 52 may be two additional income sources of the disclosed system 10.

Therefore, the electrical energy, carbon dioxide and water produced by the disclosed system 10 may offset the cost of operating the disclosed system 10 and, potentially, may render the disclosed system 10 a positive revenue source.

The separation subsystem 16 may employ various techniques to separate water and carbon dioxide from the gaseous combustion effluent 46. The type of separation technique used by the separation subsystem 16 may be dictated by various factors, including process conditions (e.g., desired purities of the collected carbon dioxide 32 and water 52) and process economics (e.g., total energy consumption of the separation subsystem 16). While a physisorption process is described below, other techniques, such as chemisorption, vortex separation and liquefaction may be used without departing from the scope of the present disclosure.

Figure 2:
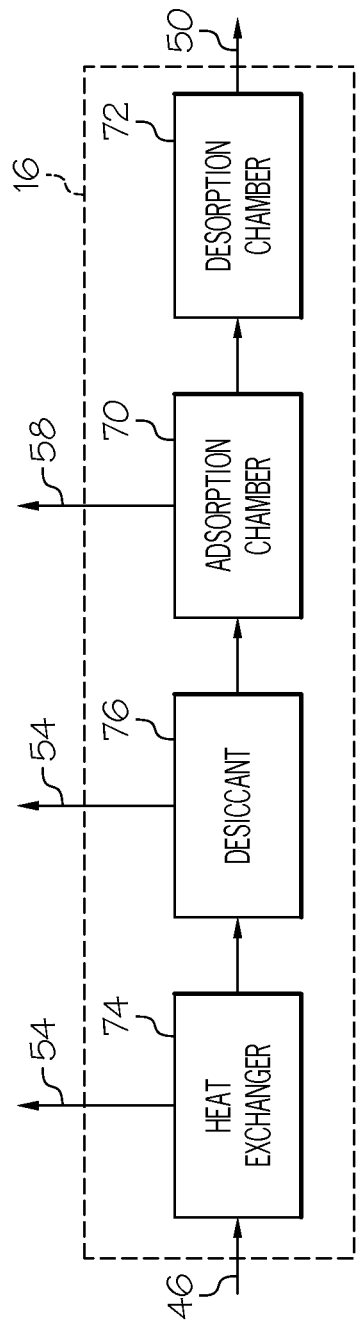
FIG. 2 is a schematic block diagram of the separation subsystem of the system of FIG. 1.

Referring to FIG. 2, in one particular construction, the separation subsystem 16 may include an adsorption chamber 70. Optionally, the separation subsystem 16 may additionally include a desorption chamber 72, a heat exchanger 74 and/or a desiccant chamber 76. Use of other components is also contemplated.

The adsorption chamber 70 may receive the gaseous combustion effluent 46, and may output a substantially carbon dioxide-free gas as exhaust 56 (FIG. 1) by way of fluid line 58. The adsorption chamber 70 may include an adsorbent material that adsorbs carbon dioxide from the gaseous combustion effluent 46 by way of a physical adsorption process (physisorption).

Various adsorbent materials may be suitable for use in the adsorption chamber 70 to adsorb carbon dioxide from the gaseous combustion effluent 46. As one general example, the adsorbent material may be a molecular sieve material, such as a molecular sieve material having a 10 angstrom effective pore opening size. As one specific example, the adsorbent material may be a zeolite material, such as a zeolite 13× molecular sieve material with a ten angstrom effective pore opening size. As another specific example, the adsorbent material may be a 5A zeolite. As yet another specific example, the adsorbent material may be a 3A zeolite.

When a sufficient amount of carbon dioxide has been adsorbed to the adsorbent material within the adsorption chamber 70, the adsorbed carbon dioxide may be released to carbon dioxide collection 32 by way of fluid line 50, thereby regenerating the adsorbent material. For example, when the concentration of carbon dioxide in the exhaust 56 exceeds a pre-determined threshold value (e.g., 2 percent by weight, 3 percent by weight, or 5 percent by weight), the adsorbed carbon dioxide may be released to carbon dioxide collection 32 to regenerate the adsorbent material.

Various techniques may be used to release the adsorbed carbon dioxide from the adsorbent material in the adsorption chamber 70. As one example, the vacuum desorption chamber 72 (which may be the same as, or separate from, the adsorption chamber 70) may be used to desorb the carbon dioxide from the adsorbent material. A vacuum may be drawn in the vacuum desorption chamber 72 (or the adsorption chamber 70). Therefore, when the adsorbent material is ready to be regenerated, the adsorption chamber 70 may be sealed, and the vacuum may be drawn in the desorption chamber 72 (or the adsorption chamber 70), thereby drawing the carbon dioxide from the adsorbent material. A cold finger may be positioned downstream of the desorption chamber 72 (or the adsorption chamber 70) such that the desorbed carbon dioxide condenses on the cold finger. As one alternative to a cold finger, compression may be used to separate the desorbed carbon dioxide.

As another example, heating, such as with microwave energy, infrared energy or the like, may be used to release the adsorbed carbon dioxide from the adsorbent material in the adsorption chamber 70.

The heat exchanger 74 may cool the gaseous combustion effluent 46 prior to the gaseous combustion effluent 46 entering the adsorption chamber 70. The cooling process may condense water within the gaseous combustion effluent 46, which may then be sent to water collection 52 (FIG. 1) by way of fluid line 54.

Cooling the gaseous combustion effluent 46 may be particularly advantageous when the separation subsystem 16 employs physical adsorption. Specifically, it may be advantageous to cool the gaseous combustion effluent 46 to within a certain temperature (e.g., 10 degrees or 5 degrees) of the adsorbent material within the adsorption chamber 70 to enhance physical adsorption. For example, when the adsorbent material is at ambient conditions (25° C.), the gaseous combustion effluent 46 may be cooled to at most 35° C. (e.g., 30° C.).

As an alternative to the heat exchanger 74 (or in addition to the heat exchanger 74), an air mover 60 (FIG. 1), such as a fan, may introduce ambient air 40 (FIG. 1) to the gaseous combustion effluent 46 prior to the separation subsystem 16 or within the separation subsystem 16. The introduction of ambient air 40 to the gaseous combustion effluent 46 may cool the gaseous combustion effluent 46, though additional cooling by way of the heat exchanger 74 may still be required to achieve the desired temperature drop of the gaseous combustion effluent 46.

Since ambient air 40 includes only about 400 ppm carbon dioxide, introducing ambient air 40 to the gaseous combustion effluent 46 may dilute the carbon dioxide content of the gaseous combustion effluent 46. In one expression, the amount of ambient air 40 introduced to the gaseous combustion effluent 46 may be controlled such that the concentration of carbon dioxide within the gaseous combustion effluent 46 does not drop below about 12 percent by weight. In another expression, the amount of ambient air 40 introduced to the gaseous combustion effluent 46 may be controlled such that the concentration of carbon dioxide within the gaseous combustion effluent 46 does not drop below about 10 percent by weight. In yet another expression, the amount of ambient air 40 introduced to the gaseous combustion effluent 46 may be controlled such that the concentration of carbon dioxide within the gaseous combustion effluent 46 does not drop below about 5 percent by weight.

Thus, cooling the gaseous combustion effluent 46 may enhance carbon dioxide collection within the adsorption chamber 70 of the separation subsystem 16.

The optional desiccant chamber 76 may remove any water remaining in the gaseous combustion effluent 46 prior to the gaseous combustion effluent 46 entering the adsorption chamber 70. The water removed at the desiccant chamber may be sent to water collection 52 (FIG. 1) by way of fluid line 54.

The desiccant chamber 76 may include a desiccant material. A variety of desiccant materials may be suitable for use in the desiccant chamber 76 to remove substantially all water from the gaseous combustion effluent 46. As one general example, the desiccant material may be a molecular sieve material. As one specific example, the desiccant material may be a molecular sieve material with an alkali metal alumino-silicate structure that has an effective pore opening of three angstroms.

Thus, the heat exchanger 74 and the desiccant chamber 76 may remove substantially all of the water originally contained in the gaseous combustion effluent 46. The resulting dry gaseous combustion effluent 46 may then be passed to the adsorption chamber 70.

Accordingly, the disclosed system 10 may use landfill gas to produce multiple sources of potential income: electrical energy, carbon dioxide and water. Additionally, the disclosed system 10 reduces or eliminates the release of greenhouses gases from landfills 22.

Figure 3:
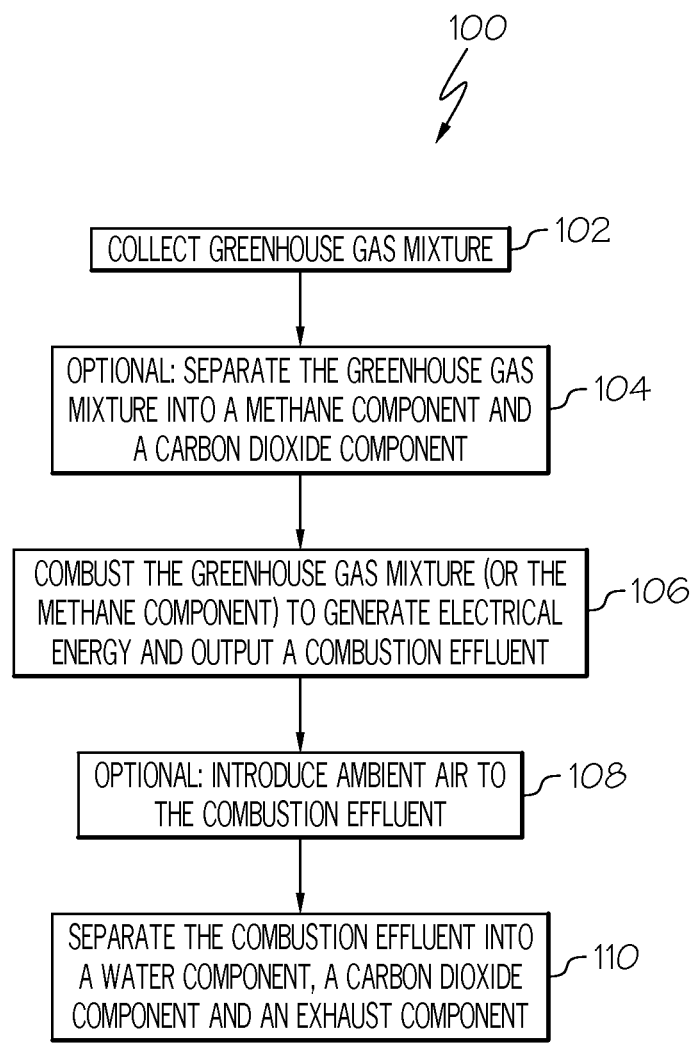
FIG. 3 is a flow chart depicting an embodiment of the disclosed method for processing greenhouse gases.

Referring to FIG. 3, also disclosed is a method 100 for processing greenhouse gases. The method 100 may begin at Block 102 with the step of collecting a greenhouse gas mixture that includes carbon dioxide and water. The greenhouse gas mixture may be landfill gas collected from a landfill.

Optionally, at Block 104, the greenhouse gas mixture may be separated into a carbon dioxide component and a methane component. The carbon dioxide component may be sent downstream, while the methane component may proceed to the following step of the disclosed method 100.

At Block 106, the greenhouse gas mixture (or the separated methane component of the greenhouse gas mixture) may be combusted to generate a gaseous combustion effluent and electrical energy. Combustion may occur in the presence of oxygen, such as by mixing ambient air with the greenhouse gas mixture. The combustion step may convert most (if not all) of the methane in the greenhouse gas mixture into carbon dioxide and water.

Optionally, at Block 108, the gaseous combustion effluent may be mixed with ambient air. The step of mixing ambient air with the gaseous combustion effluent may beneficially lower the temperature of the gaseous combustion effluent.

At Block 110, the gaseous combustion effluent may be separated into a water component, a carbon dioxide component, and an exhaust component. The water component may be collected for use or sale, or may simply be discharged. The carbon dioxide component may be collected for use, sale or sequestration. The carbon dioxide component obtain in Block 110 may be combined with the carbon dioxide component obtained in Block 104. The exhaust component may be substantially free of carbon dioxide and water, and may be released to the atmosphere.

Accordingly, the disclosed method 100 may use landfill gas to produce multiple sources of potential income: electrical energy, carbon dioxide and water. Additionally, the disclosed method 100 may reduce or eliminate the release of greenhouses gases from landfills 22.

Although various embodiments of the disclosed system and method for processing greenhouse gases have been shown and described, modifications may occur to those skilled in the art upon reading the specification. The present application includes such modifications and is limited only by the scope of the claims.

What is claimed is:

1. A system for processing greenhouse gases comprising:
  a collection subsystem configured to collect a gaseous mixture comprising carbon dioxide and methane;
  a combustion subsystem configured to combust said methane in said gaseous mixture and output a gaseous combustion effluent, wherein said combustion subsystem generates electrical energy, water and additional quantities of said carbon dioxide;
  an air mover introducing ambient air to said gaseous combustion effluent downstream of said combustion subsystem, said ambient air cooling said gaseous combustion effluent and diluting said carbon dioxide in said gaseous combustion effluent, thereby producing an ambient air/combustion effluent mixture, wherein said gaseous combustion effluent has a first carbon dioxide concentration and said ambient air/combustion effluent mixture has a second carbon dioxide concentration, wherein said second carbon dioxide concentration is less than said first carbon dioxide concentration, and wherein said second carbon dioxide concentration ranges from at least 5 percent by weight to less than said first carbon dioxide concentration; and
  a separation subsystem configured to separate said carbon dioxide from said ambient air/combustion effluent mixture, said separation subsystem comprising:
    a heat exchanger positioned to contact said ambient air/combustion effluent mixture and lower a temperature of said ambient air/combustion effluent mixture, thereby yielding a cooled mixture;
    a desiccant positioned to contact said cooled mixture and remove at least a portion of said water from said cooled mixture, thereby yielding a cooled/dried mixture; and
    a physisorption material positioned to contact said cooled/dried mixture and remove at least a portion of said carbon dioxide from said cooled/dried mixture.

2. The system of claim 1 further comprising a landfill, wherein said gaseous mixture is landfill gas.

3. The system of claim 1 wherein said gaseous mixture comprises about 45 to about 55 percent by weight of said carbon dioxide and about 55 to about 45 percent by weight of said methane.

4. The system of claim 1 wherein said combustion subsystem comprises at least one of an internal combustion engine and a turbine.

5. The system of claim 1 wherein said physisorption material comprises a zeolite.

6. The system of claim 1 further comprising a separator configured to separate said carbon dioxide from said gaseous mixture prior to said gaseous mixture passing to said combustion subsystem.

7. The system of claim 1 wherein said physisorption material is at a first temperature and said cooled/dried mixture is at a second temperature, and wherein said second temperature is at most 10 degrees Celsius warmer than said first temperature.

8. The system of claim 1 wherein said second carbon dioxide concentration ranges from at least 10 percent by weight to less than said first carbon dioxide concentration.

9. The system of claim 1 wherein said second carbon dioxide concentration ranges from at least 12 percent by weight to less than said first carbon dioxide concentration.

10. A method for processing greenhouse gases comprising:
  collecting a gaseous mixture comprising carbon dioxide and methane;
  combusting said methane to generate electrical energy and output a gaseous combustion effluent;
  introducing ambient air to said gaseous combustion effluent to cool said gaseous combustion effluent and to dilute said carbon dioxide in said gaseous combustion effluent, thereby producing an ambient air/combustion effluent mixture, wherein said gaseous combustion effluent has a first carbon dioxide concentration and said ambient air/combustion effluent mixture has a second carbon dioxide concentration, wherein said second carbon dioxide concentration is less than said first carbon dioxide concentration, and wherein said second carbon dioxide concentration ranges from at least 5 percent by weight to less than said first carbon dioxide concentration; and separating said carbon dioxide from said ambient air/combustion effluent mixture, said separating comprising:

cooling said ambient air/combustion effluent mixture, thereby yielding a cooled mixture;

contacting said cooled mixture with a desiccant to remove at least a portion of said water from said cooled mixture, thereby yielding a cooled/dried mixture; and contacting said cooled/dried mixture with a physisorption material to remove at least a portion of said carbon dioxide from said cooled/dried mixture.

11. The method of claim 10 wherein said gaseous mixture is landfill gas.

12. The method of claim 10 wherein said gaseous mixture comprises about 45 to about 55 percent by weight of said carbon dioxide and about 55 to about 45 percent by weight of said methane.

13. The method of claim 10 wherein said combusting step comprises passing said methane through an internal combustion engine.

14. The method of claim 10 wherein said combusting step comprises passing said gaseous mixture through an internal combustion engine.

15. The method of claim 10 wherein said physisorption material comprises a zeolite.

16. The method of claim 10 further comprising the step of separating said carbon dioxide from said gaseous mixture prior to said combusting step.

17. The method of claim 10 wherein said physisorption material is at a first temperature and said cooled/dried mixture is at a second temperature, and wherein said second temperature is at most 10 degrees Celsius warmer than said first temperature.

18. The method of claim 10 wherein said second carbon dioxide concentration ranges from at least 10 percent by weight to less than said first carbon dioxide concentration.

19. The method of claim 10 wherein said second carbon dioxide concentration ranges from at least 12 percent by weight to less than said first carbon dioxide concentration.

\* \* \* \* \*